(12) United States Patent
Dennert et al.

(10) Patent No.: US 11,117,637 B2
(45) Date of Patent: Sep. 14, 2021

(54) MOTORCYCLE FRAME

(71) Applicant: Harley-Davidson Motor Company Group, LLC, Milwaukee, WI (US)

(72) Inventors: Joseph Dennert, Waukesha, WI (US); Jared P. Thede, Cedarburg, WI (US); Brian Scherbarth, Menomonee Falls, WI (US); Eric John Konkel, Hartland, WI (US); John W. Schanz, Hubertus, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 224 days.

(21) Appl. No.: 16/449,868

(22) Filed: Jun. 24, 2019

(65) Prior Publication Data
US 2020/0031419 A1   Jan. 30, 2020

Related U.S. Application Data

(60) Provisional application No. 62/703,377, filed on Jul. 25, 2018.

(51) Int. Cl.
*B62K 11/02* (2006.01)
*B62K 11/12* (2006.01)

(52) U.S. Cl.
CPC ............. *B62K 11/02* (2013.01); *B62K 11/12* (2013.01)

(58) Field of Classification Search
CPC ........ B62K 11/04; B62K 11/02; B62K 19/24; B62K 11/12

(Continued)

(56) References Cited

U.S. PATENT DOCUMENTS 4,139,072 A * 2/1979 Dawson ................. B62K 11/08
180/312
4,600,207 A * 7/1986 Zosi ....................... B62K 11/04
280/276

(Continued)

FOREIGN PATENT DOCUMENTS

CN      105164583 A    12/2015
EP        1659054 A2     5/2006

(Continued)

OTHER PUBLICATIONS

English Translation of Description—JPH03186490A (Reference provided on IDS) Retrieved from Espacenet May 19, 2021 (Year: 2021).*

*Primary Examiner* — Ruth Ilan
*Assistant Examiner* — Myles A Harris
(74) *Attorney, Agent, or Firm* — Michael Best & Friedrich LLP (57) ABSTRACT

A motorcycle frame including a left side frame member, a right side frame member, and a steering head member positioned along a longitudinal center plane of the frame between the left and right side frame members. The steering head member includes a steering head portion defining a steering axis. A plurality of fastener joints are established between the steering head member, the left side frame member, and the right side frame member, the plurality of fastener joints positioned rearward of the steering head portion. A fastener joint, separate from the plurality of fastener joints, is established rearward of the plurality of fastener joints between the steering head and the left side frame member. A fastener joint, separate from the plurality of fastener joints, is established rearward of the plurality of fastener joints between the steering head and the right side frame member.

20 Claims, 7 Drawing Sheets

(58) Field of Classification Search
USPC ........................................................ 280/263
See application file for complete search history.

(56) References Cited

U.S. PATENT DOCUMENTS

| | | | |
|---|---|---|---|
| 4,694,929 A | 9/1987 | Sugimoto | |
| 4,805,716 A | 2/1989 | Tsunoda et al. | |
| 4,854,412 A | 8/1989 | Tidwell | |
| 4,887,687 A * | 12/1989 | Asai | B62K 19/12 180/219 |
| 4,989,665 A | 2/1991 | Yamagiwa et al. | |
| 5,890,980 A | 4/1999 | Heyng | |
| 6,164,675 A | 12/2000 | Pickering | |
| 6,186,550 B1 | 2/2001 | Horii et al. | |
| 6,416,072 B1 | 7/2002 | Mochizuki et al. | |
| 6,446,996 B1 | 9/2002 | Horii | |
| 6,494,302 B2 | 12/2002 | Gustafsson et al. | |
| 6,516,912 B2 | 2/2003 | Iwai et al. | |
| 6,547,269 B2 | 4/2003 | Lane | |
| 6,547,294 B2 | 4/2003 | Yamamoto | |
| 6,695,089 B2 | 2/2004 | Adachi et al. | |
| 6,796,030 B2 | 9/2004 | Mochizuki et al. | |
| 6,860,353 B2 | 3/2005 | Miyashiro | |
| 6,889,788 B2 | 5/2005 | Hakamata et al. | |
| 6,953,201 B1 | 10/2005 | VanDeMortel | |
| 7,073,617 B2 | 7/2006 | Miyashiro et al. | |
| 7,165,301 B2 | 1/2007 | Miyashiro | |
| 7,226,066 B2 | 1/2007 | Ichihara et al. | |
| 7,228,930 B1 * | 6/2007 | Vey | B62K 13/04 180/209 |
| 7,252,171 B2 | 8/2007 | Augustine, Jr. | |
| 7,331,593 B2 | 2/2008 | Okabe et al. | |
| 7,383,909 B2 * | 6/2008 | Kawase | B62K 11/04 180/219 |
| 7,390,023 B2 | 6/2008 | Hirose et al. | |
| 7,407,031 B2 | 8/2008 | Hayashi et al. | |
| 7,490,689 B2 | 2/2009 | Seki et al. | |
| 7,503,576 B1 | 3/2009 | Schroeder | |
| 7,677,134 B2 | 3/2010 | Kitsunai et al. | |
| 7,677,347 B2 | 3/2010 | Brawn | |
| 7,681,680 B2 | 3/2010 | Ishikawa et al. | |
| 7,694,985 B2 | 4/2010 | Hoshi | |
| 7,762,587 B2 | 7/2010 | Maeda et al. | |
| 7,828,103 B2 | 11/2010 | Imura | |
| 7,971,887 B2 | 7/2011 | Dorr et al. | |
| 8,453,781 B2 | 6/2013 | Kawai | |
| 8,668,218 B2 | 3/2014 | Toda et al. | |
| 8,672,077 B2 * | 3/2014 | Sand | B62K 25/00 180/220 |
| 8,813,894 B1 * | 8/2014 | Horikawa | B62K 25/283 180/227 |
| 8,985,608 B2 | 3/2015 | Oikawa | |
| 9,434,441 B1 * | 9/2016 | Sand | B62K 19/32 |
| 9,440,504 B2 | 9/2016 | Bagnariol et al. | |
| 9,527,544 B2 | 12/2016 | Yoshida | |
| D887,310 S * | 6/2020 | McGinley | D12/117 |
| 2004/0182634 A1 * | 9/2004 | Adachi | B62K 11/04 180/312 |
| 2006/0219463 A1 * | 10/2006 | Seki | B62K 19/20 180/311 |
| 2009/0008180 A1 | 1/2009 | Stefanelli et al. | |
| 2010/0101090 A1 | 4/2010 | Nakano et al. | |
| 2010/0193275 A1 | 8/2010 | Song et al. | |
| 2010/0194072 A1 * | 8/2010 | Katsura | B62K 19/28 280/274 |
| 2013/0026733 A1 * | 1/2013 | Oe | B62K 11/04 280/281.1 |
| 2014/0262580 A1 * | 9/2014 | Bagnariol | B62K 19/18 180/218 |
| 2015/0122563 A1 * | 5/2015 | Kondo | H01M 10/655 180/68.5 |
| 2015/0274241 A1 * | 10/2015 | Matsuo | B62K 19/20 280/279 |
| 2015/0375596 A1 * | 12/2015 | Blain | B60K 11/00 165/47 |

FOREIGN PATENT DOCUMENTS

| | | | |
|---|---|---|---|
| EP | 1698548 B1 | 6/2006 | |
| JP | S61160375 A | 7/1986 | |
| JP | 1101283 A | 4/1989 | |
| JP | 1204879 A | 8/1989 | |
| JP | 1240390 A | 9/1989 | |
| JP | 1317889 A | 12/1989 | |
| JP | 2034491 A | 2/1990 | |
| JP | 2099484 A | 4/1990 | |
| JP | 2258488 A | 10/1990 | |
| JP | 3157282 A | 7/1991 | |
| JP | 3186490 A | 8/1991 | |
| JP | 3186491 A | 8/1991 | |
| JP | 4011590 A | 1/1992 | |
| JP | 4031189 A | 2/1992 | |
| JP | 5112274 A | 5/1993 | |
| JP | 5221362 A | 8/1993 | |
| JP | 6099870 A | 4/1994 | |
| JP | 2000053058 A | 2/2000 | |
| JP | 2001071974 A | 3/2001 | |
| JP | 2009007002 A | 1/2009 | |
| JP | 2010058786 A | 3/2010 | |
| JP | 2011160506 A | 8/2011 | |
| JP | 2012236467 A | 12/2012 | |
| JP | 5736981 B2 | 6/2015 | |
| JP | 5795873 B2 | 10/2015 | |
| JP | 6159604 B2 | 7/2017 | |
| WO | WO-9744234 A1 * | 11/1997 | B62K 19/12 |
| WO | WO03/057552 A1 | 7/2003 | |
| WO | WO-2004080787 A1 * | 9/2004 | B62K 11/04 |
| WO | WO-2006003759 A1 * | 1/2006 | B62K 11/04 |
| WO | WO-2019017478 A1 * | 1/2019 | B62K 11/04 |

* cited by examiner

MOTORCYCLE FRAME

CROSS-REFERENCE TO RELATED APPLICATIONS

This application claims priority to U.S. Provisional Patent Application No. 62/703,377, filed Jul. 25, 2018, the entire contents of which are incorporated by reference herein.

BACKGROUND

The present disclosure relates to multi-piece frames for motorcycles.

SUMMARY

In one aspect, the invention provides a motorcycle frame including a left side frame member, a right side frame member, and a steering head member positioned along a longitudinal center plane of the frame between the left and right side frame members. The steering head member includes a steering head portion defining a steering axis. A plurality of fastener joints are established between the steering head member, the left side frame member, and the right side frame member, the plurality of fastener joints positioned rearward of the steering head portion. A fastener joint, separate from the plurality of fastener joints, is established rearward of the plurality of fastener joints between the steering head and the left side frame member. A fastener joint, separate from the plurality of fastener joints, is established rearward of the plurality of fastener joints between the steering head and the right side frame member.

In another aspect, the invention provides a motorcycle frame including a left side frame member, a right side frame member, and a steering head member positioned along a longitudinal center plane of the frame between the left and right side frame members. The steering head member includes a steering head portion defining a steering axis. A plurality of fastener joints are established between the steering head member, the left side frame member, and the right side frame member. The plurality of fastener joints are positioned exclusively rearward of the steering head portion. The left side frame member is positioned exclusively on a left side of the longitudinal centerline and spaced therefrom, and the right side frame member is positioned exclusively on a right side of the longitudinal centerline and spaced therefrom.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 6:
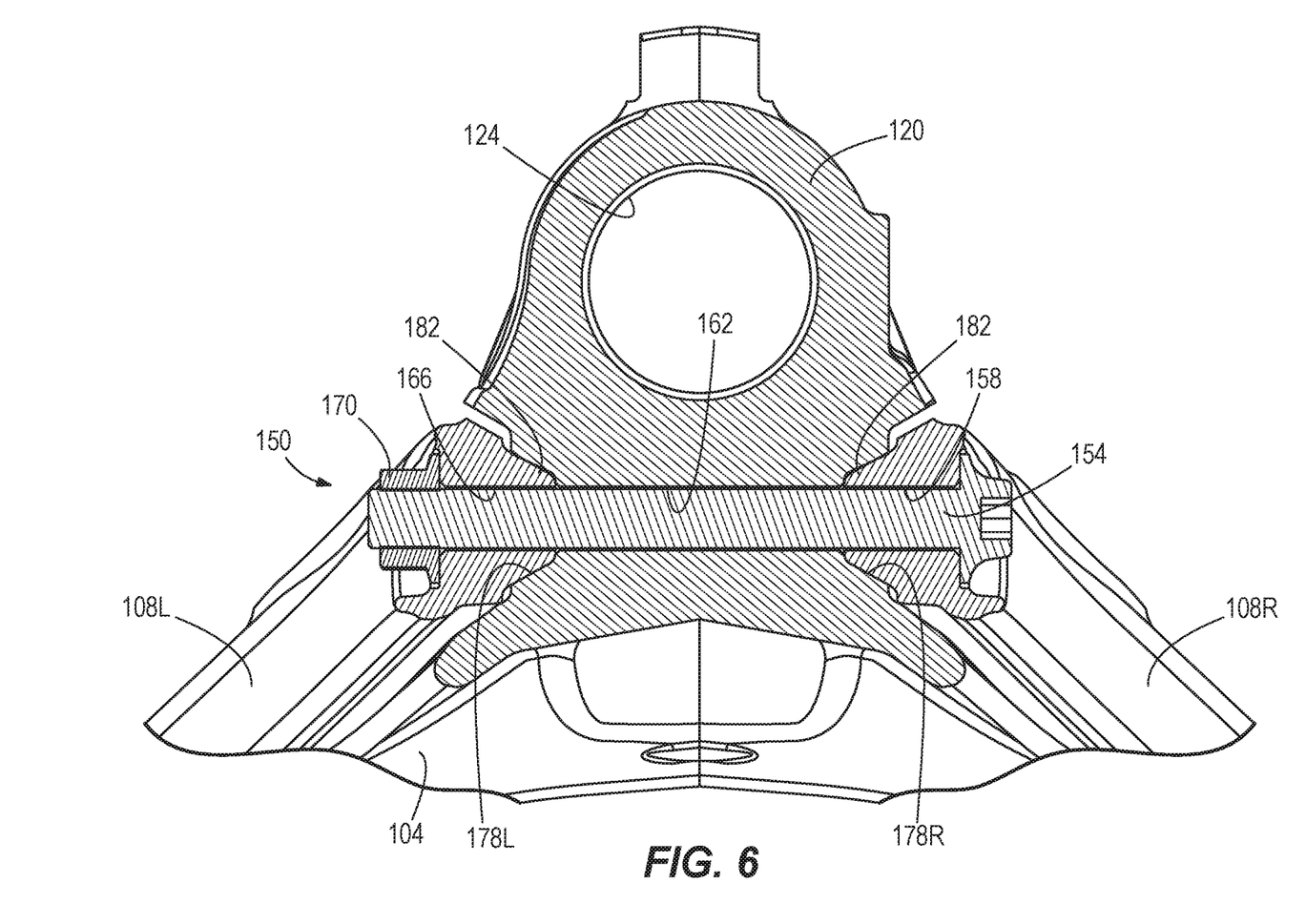
FIG. 6 is a cross-section view taken through a forward fastener joint of the frame assembly of FIG. 1.
Figure 7:
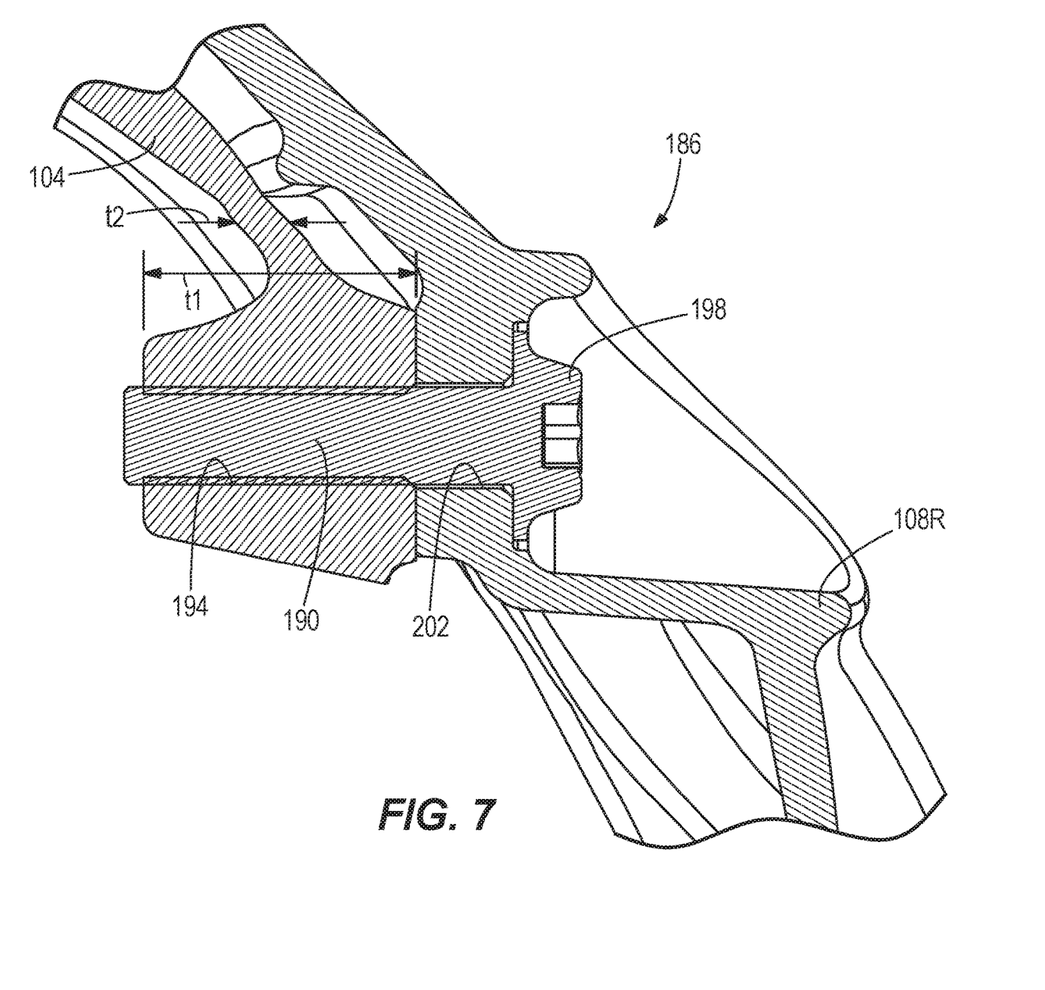
FIG. 7 is a cross-section view taken through a rearward fastener joint of the frame assembly of FIG. 1.
Figure 8:
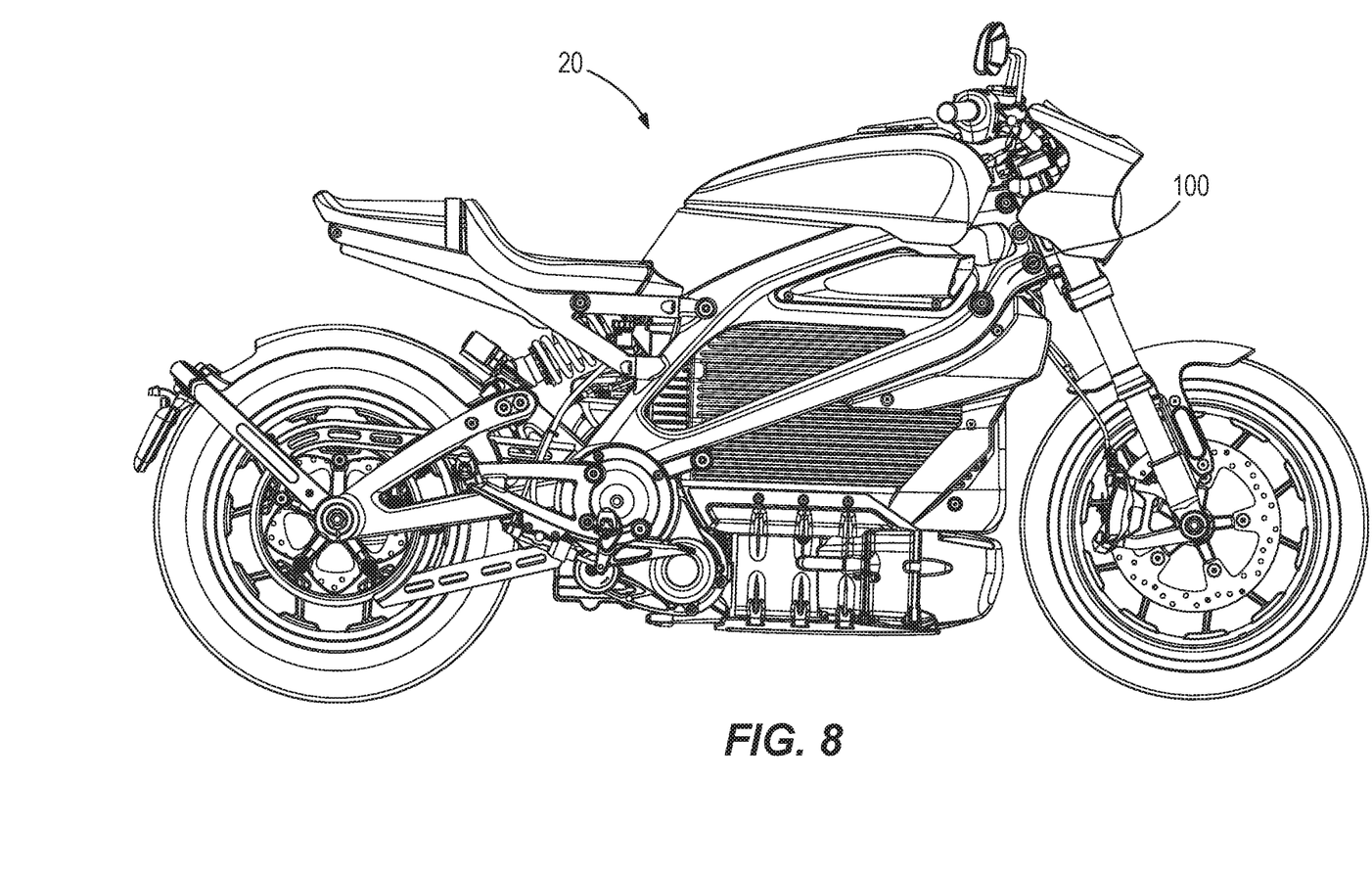
FIG. 8 is a side view of a motorcycle including the frame assembly of FIGS. 1-7.

FIGS. 1-7 illustrate a motorcycle frame 100 for a motorcycle 20 (FIG. 8). The motorcycle 20 is a 2-wheeled, single-track motorcycle, for example. In some constructions, the motorcycle 20 is an electric motorcycle having a powertrain with a battery-powered electric motor that drives the rear wheel. The frame 100 as illustrated is a multi-piece motorcycle mainframe assembly assembled from multiple separately-formed pieces or members. Further, the frame 100 is adapted to be assembled with additional structures, such as a power source (internal combustion engine and/or electric motor), an optional multi-speed transmission, a steering assembly, a swingarm assembly, and a seating assembly in constructing a motorcycle. The frame 100 may interface directly or indirectly with any or all of the above structures, and it is also noted that additional accessories are supported by the frame 100, including foot pegs, handlebars, a fuel tank and/or battery pack, rider-operable controls including switches and levers, instrumentation, etc. The illustrated frame 100 includes as its primary elements a steering head member 104, a left side member 108L, and a right side member 108R. The left and right side members 108L, 108R are independently coupled to the steering head member 104. The left and right side members 108L, 108R are not directly engaged or coupled to each other, but rather are spaced apart from each other on opposite sides of a longitudinal center plane CP of the frame 100 by the steering head member 104. Each of the left and right side members 108L, 108R is coupled to the steering head member 104 with a plurality of threaded fasteners, defining respective fastener joints and these are described in further detail below. In some constructions, each of the left and right side members 108L, 108R and the steering head member 104 is a metal casting (e.g., aluminum). As shown, each of the left and right side members 108L, 108R and the steering head member 104 can have a trellis configuration including a number of material segments defining one or more openings as viewed from the side. For example, each of the left and right side members 108L, 108R includes an outer perimeter and two intermediate web segments 112 defining three openings 116 in side view. The steering head member 104 includes a steering head portion 120 (defining a predominantly vertical steering head channel 124 and a corresponding steering axis A) and integrally-formed upper and lower webs that are connected at a rearward end of the steering head portion 120 by vertical web segments 128 so that a single opening 132 is defined on each of the left and right sides of the steering head portion 120. The opening 132 on either side overlaps with and matches the shape of a forward-most one of the openings 116 of the left or right side member 108L, 108R to effectively establish one common opening.

The steering head portion 120 is contiguously formed exclusively by the steering head member 104 with neither the left side frame member 108L nor the right side frame member 108R. Further, as illustrated, forward edges of the left and right side frame members 108L, 108R are offset to the rear of the steering axis A (e.g., the forward edges may extend parallel to the steering axis A). As such, in the left and right side views, the steering head portion 120 is exposed while the remainder of the steering head member 104 is concealed by the left and right side frame members 108L, 108R. The concealed portion of the steering head member 104 makes up a majority of an overall area defined by an outer perimeter of the steering head member in side view.

As shown, each of the left and right side members 108L, 108R and the steering head member 104 can be formed as a ribbed shell member. This is in contrast to a closed-section construction (e.g., tube or box section). The left and right side members 108L, 108R can be formed as individual castings (e.g., of aluminum). As shown, each of the left and right side members 108L, 108R and the steering head member 104 has convex outward-facing surfaces and concave inward-facing surfaces. Stiffening ribs are provided across the inward-facing surfaces. Additionally, dispersed throughout the left and right side members 108L, 108R are a plurality of fastener-receiving apertures 136 (e.g., for attachment of a rechargeable energy storage system including a battery pack 140, FIG. 3). The left and right side members 108L, 108R include respective apertures 144 at rear ends thereof that are aligned to define a swing arm pivot, for example receiving a swing arm pivot shaft. The left and right side members 108L, 108R may further include respective apertures 146 (e.g., two each) for attachment with a seat frame member(s), not shown.

Figure 1:
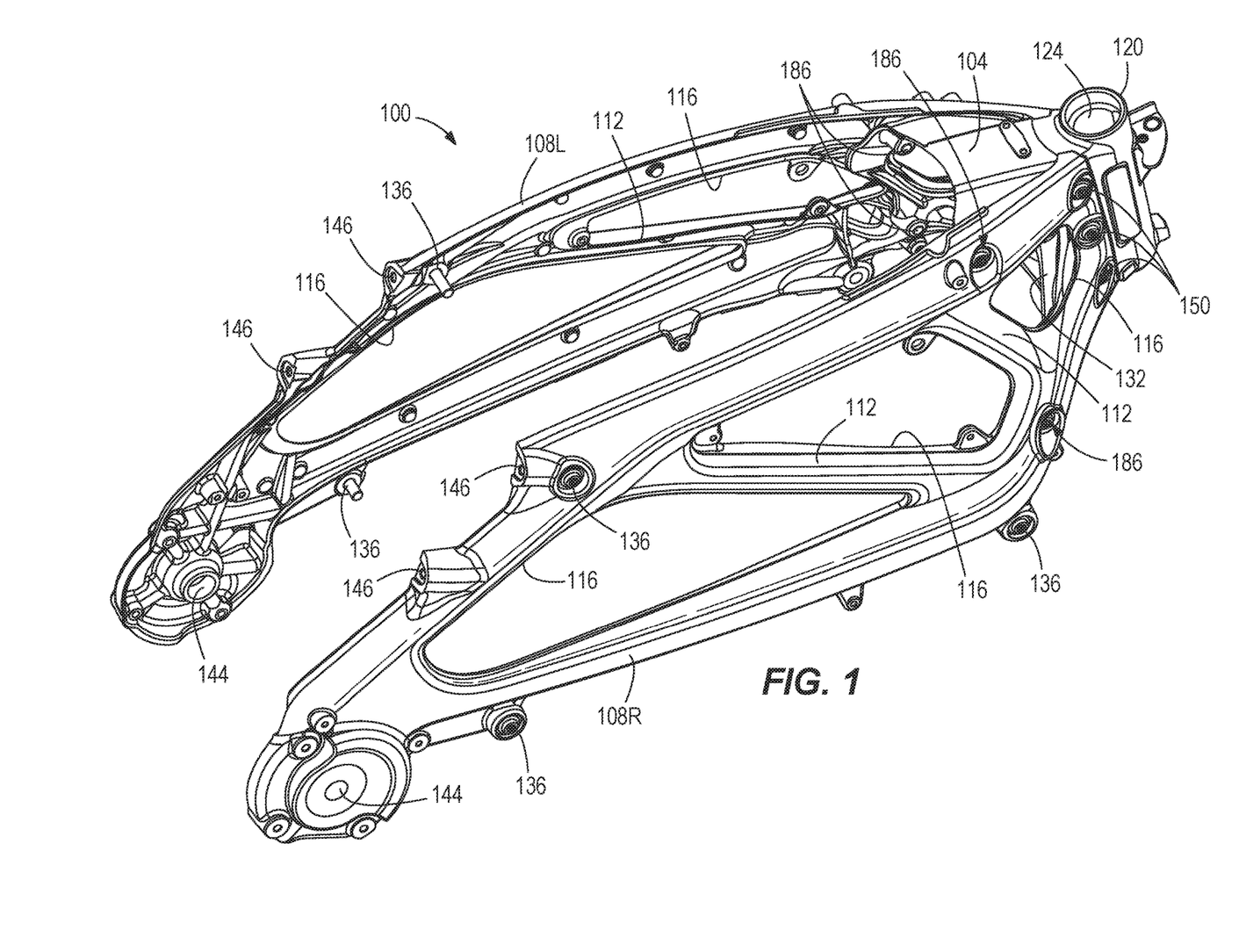
FIG. 1 is a perspective view of a motorcycle frame assembly.
Figure 2:
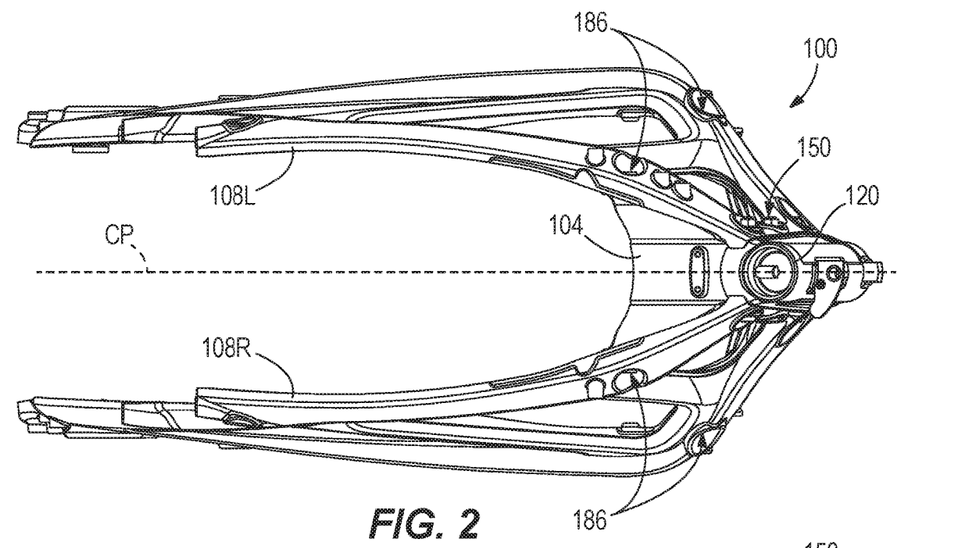
FIG. 2 is a top view of the frame assembly of FIG. 1.
Figure 3:
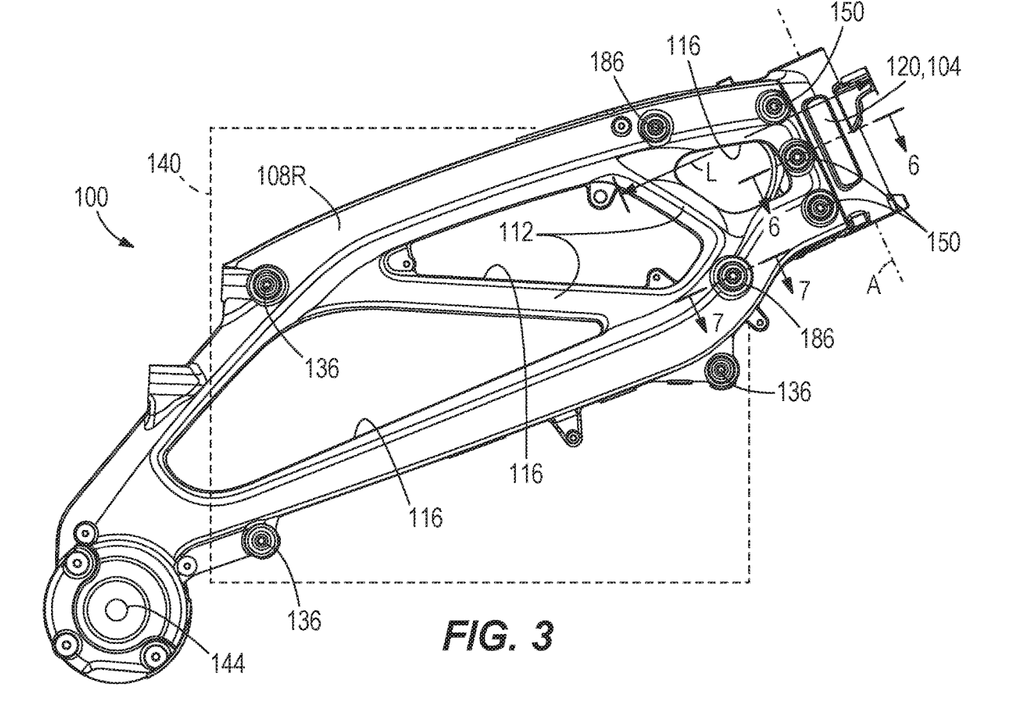
FIG. 3 is a right side view of the frame assembly of FIG. 1.
Figure 4:
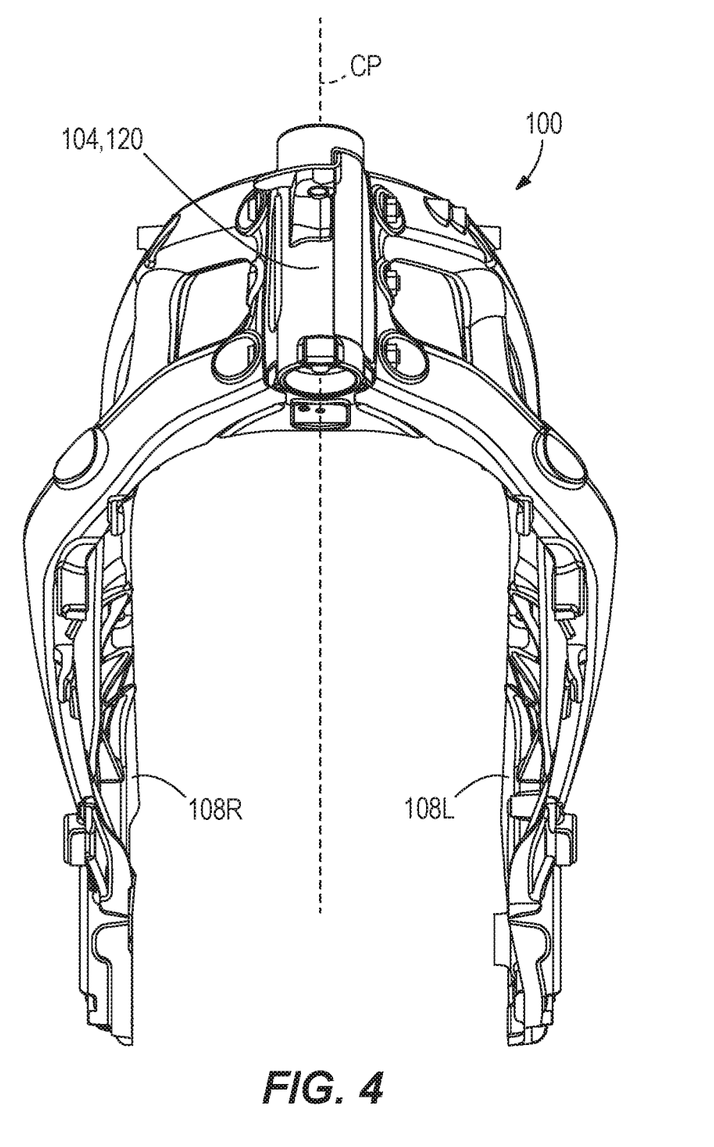
FIG. 4 is a front view of the frame assembly of FIG. 1.
Figure 5:
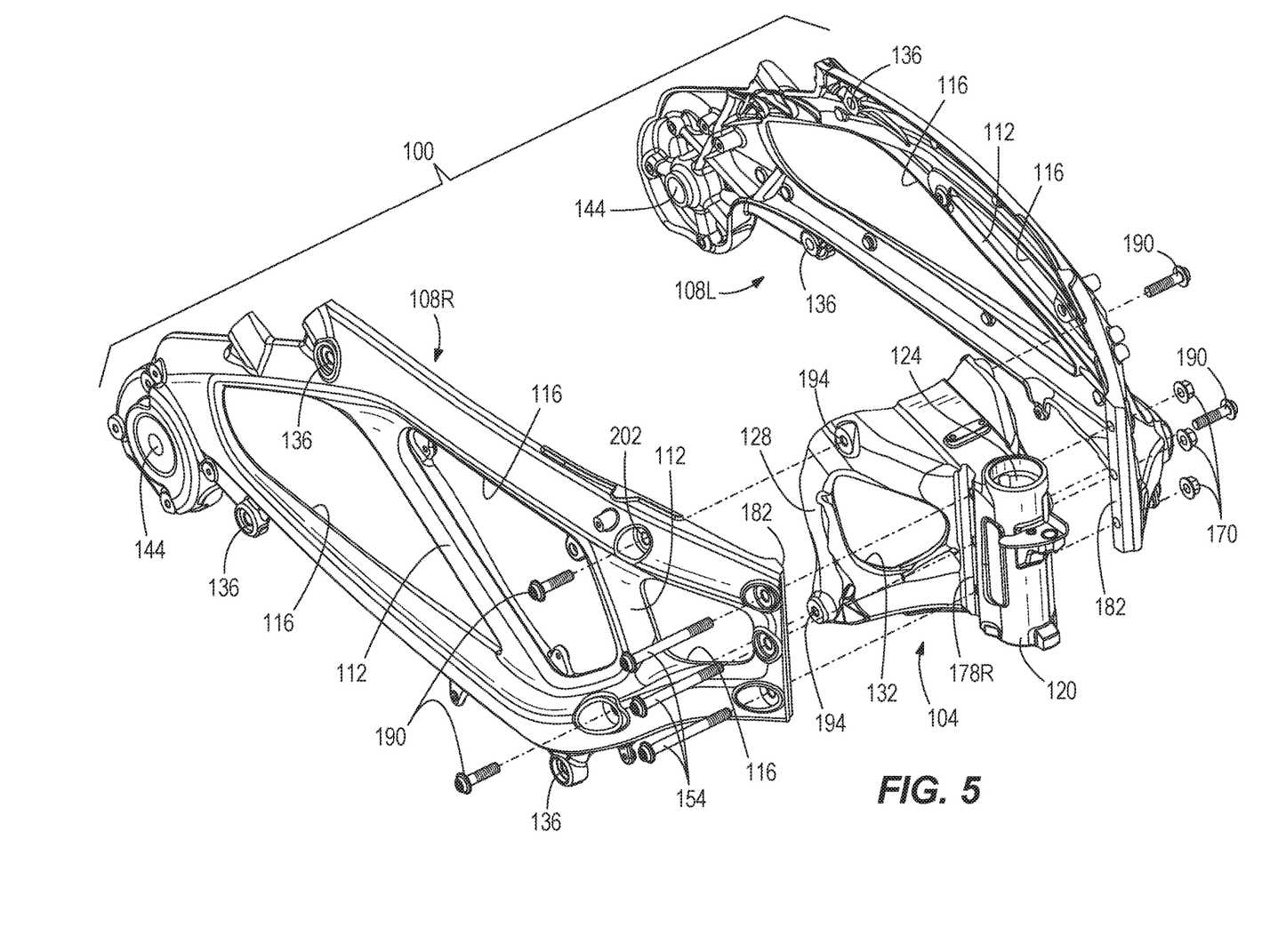
FIG. 5 is an exploded assembly view of the frame assembly of FIG. 1.

The steering head member 104 is secured to the left and right side members 108L, 108R with a plurality of fastener joints 150 arranged toward a forward end of the steering head member 104. Each of these fastener joints 150 is positioned aft of the steering head portion 120 and the steering head channel 124 defining the steering axis A. The group of fastener joints 150 can include more than two bolted joints (e.g., three) arranged in a single row or aligned in side view (FIG. 3). The single row can be parallel to the steering axis A defined by the steering head portion 120. The fastener joints 150 are the forwardmost joints between the steering head member 104 and the left and right side frame members 108L, 108R. As best shown in FIG. 6, each of the fastener joints 150 is formed between the steering head member 104 and both of the left and right side members 108L, 108R. Each fastener joint 150 includes a threaded fastener 154 (e.g., bolt) that extends through an aperture 158 in a first one of the left and right side members 108L, 108R (e.g., the right side member 108R), through an aperture 162 in the steering head member 104, through an aperture 166 in the other of the left and right side members 108L, 108R (e.g., the left side member 108L), and into engagement with a nut 170 on an exterior side of the side member 108L to define a bolted joint. Thus, the apertures 158, 166 in the left and right side members 108L, 108R are unthreaded, and the fastener 154 may be unthreaded in the shank portions engaged with the apertures 158, 166. However, in other constructions, each of the second apertures 166 may be threaded and the nuts 170 omitted. The fasteners 154 can extend directly or predominantly perpendicular to the longitudinal center plane CP, and each fastener 154 crosses the longitudinal center plane CP. Heads 174 of the fasteners 154 may be received in pockets formed in the exterior side of the side member 108R to be partially or fully concealed in top and/or front view. Likewise, the nuts 170 may be received in pockets formed in the exterior side of the side member 108L to be partially or fully concealed in top and/or front view. The apertures 162 through the steering head member 104 are located along and within respective troughs or channels 178L, 178R formed on the respective lateral exterior sides of the steering head member 104. Opposing fore and aft flat surfaces of each channel 178L, 178R taper toward each other in a direction toward the longitudinal center plane CP. Similarly, the corresponding portions of the left and right side members 108L, 108R that have the apertures 158, 166 have complementary tapered surfaces forming a nose 182 that engages the surfaces of the respective channels 178L, 178R. Thus, tightening of the fastener joints 150 enacts a wedging action that urges an increasingly tighter fit, in a direction perpendicular to the length directions of the fasteners 154, between the steering head member 104 and the left and right side members 108L, 108R.

Although located aft of the steering head portion 120, the fastener joints 150 are located in a forward half of the steering head member 104, and may be described as being located directly aft of the steering head portion 120. A length L (FIG. 3) of the steering head member 104, measured perpendicular to the steering axis A, is formed in majority rearward of the fastener joints 150. Additional fastener joints 186 are located in the rearward half of the steering head member 104, optionally along the rearward edge of the steering head member 104. Thus, the additional fastener joints 186 are spaced across the openings 132 from the forward fastener joints 150. FIG. 7 provided a cross-section view of one such fastener joint 186. Unlike the forward fastener joints 150, the additional fastener joints 186 are made between the steering head member 104 and the individual ones of the left and right side members 108L, 108R. Also unlike the forward fastener joints 150, the additional fastener joints 186 are established by fasteners 190 that engage threaded frame apertures 194 in the steering head member 104, without the use of nuts. Heads 198 of the fasteners 190 may be received in pockets formed in the exterior side of the side members 108L, 108R at the location of the fastener-receiving apertures 202 in order to be partially or fully concealed in top and/or front view. As shown in FIG. 7, the steering head member 104 may have a drastically increased material thickness t1 (measured in the axial direction of the fastener 190) at the locations of the apertures 194 as compared to a thickness t2 directly forward of the fastener joint 186, even when the thickness t2 is measured parallel to t1 rather than perpendicular to the surfaces forming the steering head member 104. In some constructions, the thickness t1 at the locations of the apertures 194 is at least three times or at least four times the thickness t2. Although each lateral side of the steering head member 104 is shown to include two threaded apertures 194, one at the top end and one at the bottom end, the steering head member 104 can include one or more than two apertures on each lateral side for receiving the fastener(s) 190. In any case, the steering head member 104 as a whole defines multiple fastener joints 186 spaced rearward of the forward fastener joints 150 at the steering head portion 120. As such, there are multiple fastener joints 150 along the front of the openings 116, 132 and multiple fastener joints 186 along the rear of the frame openings 116, 132.

In the context of this disclosure, fasteners and fastener joints refers to the use of mechanical fastening devices and not to welding or integrally casting/forging, etc. In some constructions, fastener joints are capable of disassembly without the need for destructive means to either the frame or the fastener(s). In other cases, fasteners may be permanent fasteners, or one-time install only. Throughout the illustrated embodiment, threaded fasteners are used to make a plurality of bolt joints, which is used herein to refer generally to removable threaded fastener joints.

Although the disclosure has been described in detail with reference to certain preferred embodiments, variations and modifications exist within the scope and spirit of one or more independent aspects of the disclosure as described.

Various features and advantages of the disclosure are set forth in the following claims.

What is claimed is:

1. A motorcycle frame comprising:
a left side frame member;
a right side frame member; and
a steering head member positioned along a longitudinal center plane of the frame between the left and right side frame members, the steering head member including a steering head portion defining a steering axis;
a plurality of fastener joints established between the steering head member, the left side frame member, and the right side frame member, the plurality of fastener joints positioned rearward of the steering head portion;
a fastener joint, separate from the plurality of fastener joints, established rearward of the plurality of fastener joints between the steering head member and the left side frame member; and
a fastener joint, separate from the plurality of fastener joints, established rearward of the plurality of fastener joints between the steering head member and the right side frame member.

2. The motorcycle frame of claim 1, wherein the steering head portion is contiguously formed exclusively by the steering head member with neither the left side frame member nor the right side frame member.

3. The motorcycle frame of claim 1, wherein forward edges of the left and right side frame members are offset to the rear of the steering axis.

4. The motorcycle frame of claim 1, wherein the plurality of fastener joints are arranged in a row parallel to the steering axis.

5. The motorcycle frame of claim 1, wherein the left side frame member is positioned exclusively on a left side of the longitudinal centerline and spaced therefrom, and wherein the right side frame member is positioned exclusively on a right side of the longitudinal centerline and spaced therefrom.

6. The motorcycle frame of claim 1, wherein the fastener joints of the plurality of fastener joints are the forwardmost joints between the steering head member and the left and right side frame members.

7. The motorcycle frame of claim 1, wherein in left and right side views, the steering head member, with the exception of the steering head portion, is concealed by the left and right side frame members.

8. The motorcycle frame of claim 1, wherein a length of the steering head member, measured perpendicular to the steering axis, is formed in majority rearward of the plurality of fastener joints.

9. The motorcycle frame of claim 1, wherein the steering head member includes a first pair of flat tapered surfaces flanking fore and aft sides of the plurality of fastener joints, and the left side frame member includes a pair of flat tapered surfaces engaged with the first pair of flat tapered surfaces of the steering head member, and wherein the steering head member includes a second pair of flat tapered surfaces flanking fore and aft sides of the plurality of fastener joints, and the right side frame member includes a pair of flat tapered surfaces engaged with the second pair of flat tapered surfaces of the steering head member.

10. The motorcycle frame of claim 1, wherein the left side frame member, the right side frame member, and the steering head member are free from weld joints therebetween.

11. A motorcycle frame comprising:
a left side frame member;
a right side frame member;
a steering head member positioned along a longitudinal center plane of the frame between the left and right side frame members, the steering head member including a steering head portion defining a steering axis; and
a plurality of fastener joints established between the steering head member, the left side frame member, and the right side frame member, the plurality of fastener joints positioned exclusively rearward of the steering head portion,
wherein the left side frame member is positioned exclusively on a left side of the longitudinal centerline and spaced therefrom, and wherein the right side frame member is positioned exclusively on a right side of the longitudinal centerline and spaced therefrom.

12. The motorcycle frame of claim 11, wherein the left side frame member, the right side frame member, and the steering head member are free from weld joints therebetween.

13. The motorcycle frame of claim 11, wherein the steering head portion is contiguously formed exclusively by the steering head member with neither the left side frame member nor the right side frame member.

14. The motorcycle frame of claim 11, wherein forward edges of the left and right side frame members are offset to the rear of the steering axis.

15. The motorcycle frame of claim 11, wherein the plurality of fastener joints are arranged in a row parallel to the steering axis.

16. The motorcycle frame of claim 11, wherein the plurality of fastener joints are rearward of the steering axis, and wherein, forward of the steering axis, the left and right side frame members are both free from joints with the steering head member and free from joints with each other.

17. The motorcycle frame of claim 11, wherein in left and right side views, the steering head member, with the exception of the steering head portion, is concealed by the left and right side frame members.

18. The motorcycle frame of claim 11, wherein a length of the steering head member, measured perpendicular to the steering axis, is formed in majority rearward of the plurality of fastener joints.

19. The motorcycle frame of claim 11, wherein the steering head member includes a first pair of flat tapered surfaces flanking fore and aft sides of the plurality of fastener joints, and the left side frame member includes a pair of flat tapered surfaces engaged with the first pair of flat tapered surfaces of the steering head member, and wherein the steering head member includes a second pair of flat tapered surfaces flanking fore and aft sides of the plurality of fastener joints, and the right side frame member includes a pair of flat tapered surfaces engaged with the second pair of flat tapered surfaces of the steering head member.

20. The motorcycle frame of claim 11, wherein, separate from the plurality of fastener joints, additional fastener joints are established, respectively, between the steering head and each of the left and right side frame members.

* * * * *